Nov. 22, 1938.  W. OFFERMANNS  2,137,346

DEVICE FOR GUIDING THE ROLLERS OF ANTIFRICTION BEARINGS

Filed June 15, 1937

Inventor:
Wilhelm Offermanns
By
Atty.

Patented Nov. 22, 1938

2,137,346

UNITED STATES PATENT OFFICE 2,137,346

DEVICE FOR GUIDING THE ROLLERS OF ANTIFRICTION BEARINGS

Wilhelm Offermanns, Aachen, Germany, assignor to Schumag Schumacher Metallwerke Aktiengesellschaft für Prazisionsmechanik, Aachen, Germany Application June 15, 1937, Serial No. 148,381
In Germany July 4, 1936

1 Claim. (Cl. 308—217)

The present invention relates to a device for guiding the rollers of anti-friction bearings and more particularly of so-called needle bearings.

As a rule rollers of anti-friction bearings are guided by means of retainers or retainer rings which are so constructed that between each two adjacent rollers there is a partition which prevents the said rollers from coming into contact with each other. As, however, in the case of bearings comprising long but thin rollers, viz. of so-called needle bearings, these partitions result in the distance of the rollers or needles being excessive relatively to the diameter of the rollers, the permissible load of the bearings so constructed is sensibly diminished.

In order to avoid this inconvenience, the retainers referred to have been omitted from needle bearings so that the rollers or needles thereof may be arranged in a continuous row. But in consequence thereof the needles are in mutual contact and exert heavy friction upon one another, or in the case of viscous lubricants, stick to one another and thus the rolling motion thereof will be partly prevented and the total frictional resistance of the bearing sensibly increased.

It is an object of the present invention to provide for a device which does away with the evil referred to and still allows of a compact arrangement of the roller or needle bearing.

According to the new device the needles can by means of a suitable device be disposed in close proximity to one another the distance left between each two adjacent rollers or needles being nevertheless sufficient for preventing the same from objectionably rubbing against or sticking to one another.

The invention is realized by providing two spaced retainer rings which alternately guide one end only of each two adjacent rollers or needles or which guide either end of every second needle while the intermediate needles are allowed to freely move with a small clearance between the two adjacent needles guided.

In more fully describing the invention hereinafter, reference will be made to the accompanying drawing, which forms a part of this specification.

In this drawing:—

Figure 1:
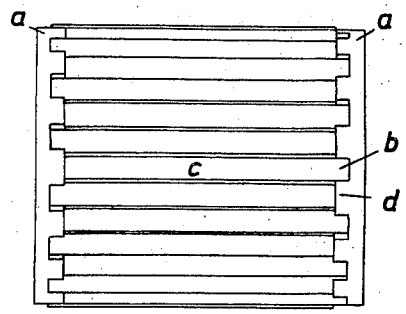
Fig. 1 is a side elevation of two retainer rings alternately guiding one end of each roller or needle.
Figure 2:
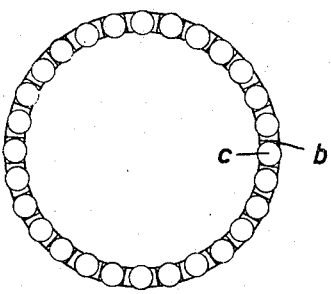
Fig. 2 is a front elevation of one of the rings shown in Fig. 1, with the needles guided.
Figure 5:
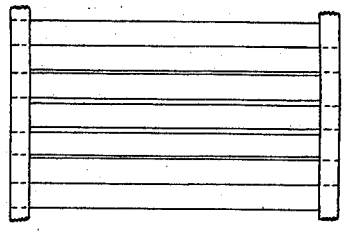
Figure 6:
Figure 7:
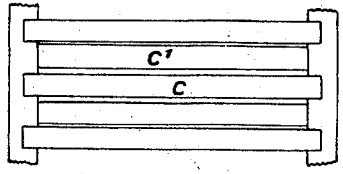

Figs. 3, 4 and 5, 6 respectively in side and front elevations illustrate modifications of the embodiment shown in Figs. 1 and 2, and Fig. 7 shows an embodiment in which every second needle is guided by the two retainer rings.

Referring now to Figs. 1 and 2, the retainer rings $a$ are provided with straight radial grooves $b$ in which the needles $c$ are each guided alternately at one end only. The grooves or depressions $b$ may also be so shaped that they engage the needles on a larger portion of their periphery. On account of the fact that only one end of each two adjacent needles is guided by either ring there is, in spite of the small distance between the needles, left a substantial guiding lug $d$ between each two grooves $b$. Although the extreme end not guided of a needle is liable to come at one point into contact with one of the adjacent needles, this does not interfere with the rolling movement of the needles. The width in a radial direction of the retainer rings may in this embodiment be so small that the needles are allowed to project therefrom both inwards and outwards, and the whole unit can readily be pushed into the bore provided for the particular bearing.

Figure 3:
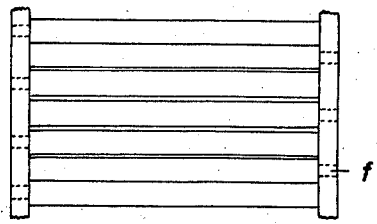
Figure 4:

According to Figs. 3 and 4 the needles are likewise guided in narrow retainer rings, the slots being however replaced by circular holes so that the needles are necessarily provided with journals $f$ at the ends to be guided.

When, however, the use of larger retainer rings encounters no difficulty these rings may also be provided with larger circular recesses having the full diameter of the needles so that according to Figs. 5 and 6 the said journals can be dispensed with, the recesses being so located that the needles still sufficiently project radially inward from the said rings.

According to Fig. 7, the needles $c$ are guided at either end by the two retainer rings while the needles $c^1$ can freely move between the needles $c$ guided. Also in this instance there will occur no friction liable to prevent the free rolling movement of the needles. It is true that the free needles can slightly contact, on one side only, against the guided ones, but never will a needle be pressed between two adjacent needles in consequence of the total pressure of a plurality of needles as is the case in needle bearings having no retainer rings.

Having now described my invention, what I claim as new and desire to secure by Letters Patent is:—

An anti-friction bearing, comprising a pair of spaced retainer rings and a series of successive needle-like rollers in close proximity to one another between these rings, one of the said rings having recesses for loosely receiving and holding one end of every second roller and the other ring having recesses staggered with relation to the former for loosely receiving and holding the opposite end of each of the other rollers.

WILHELM OFFERMANNS.